United States Patent [19]
Scraver et al.

[11] Patent Number: 6,024,397
[45] Date of Patent: Feb. 15, 2000

[54] ROTATING SEAT/STORAGE UNIT

[75] Inventors: Robert B. Scraver; David B. Busch; Chester R. Wisniewski, all of Holland, Mich.

[73] Assignee: Prince Corporation, Holland, Mich.

[21] Appl. No.: 08/999,221

[22] Filed: Dec. 29, 1997

[51] Int. Cl.[7] .................................................. B60N 2/02
[52] U.S. Cl. .................................. 296/65.05; 296/65.13; 296/66; 297/3; 297/15; 297/335
[58] Field of Search .............................. 296/65.05, 65.09, 296/66, 69, 65.13; 297/1–3, 15, 326, 335

[56] References Cited

U.S. PATENT DOCUMENTS

| | | |
|---|---|---|
| Re. 6,561 | 7/1875 | Cahill . |
| 173,774 | 2/1876 | Dennett . |
| 519,832 | 5/1894 | Bradley et al. .......................... 296/66 |
| 914,334 | 3/1909 | Buff . |
| 1,203,831 | 11/1916 | Wittman . |
| 1,649,608 | 11/1927 | Matthews ............................ 296/65.09 |
| 1,887,947 | 11/1932 | Savale . |
| 1,894,103 | 1/1933 | Kuenzel . |
| 2,956,837 | 10/1960 | Koplin . |
| 3,806,183 | 4/1974 | Sieren et al. . |
| 4,869,541 | 9/1989 | Wainwright . |
| 5,064,246 | 11/1991 | Pipon et al. . |
| 5,230,523 | 7/1993 | Wilhelm . |
| 5,269,581 | 12/1993 | Odagaki et al. . |
| 5,492,386 | 2/1996 | Callum . |
| 5,535,931 | 7/1996 | Barlow et al. . |
| 5,690,381 | 11/1997 | Hasegawa et al. . |
| 5,868,451 | 2/1999 | Uno et al. ................................ 296/66 |

FOREIGN PATENT DOCUMENTS

| | | | |
|---|---|---|---|
| 1096280 | 6/1955 | France . | |
| 268433 | 12/1913 | Germany ............................ 296/65.09 |

*Primary Examiner*—Dennis H. Pedder
*Attorney, Agent, or Firm*—Price, Heneveld, Cooper, DeWitt & Litton

[57] ABSTRACT

A seat platform extends between the sidewalls of a vehicle and is mounted to rotating members and is offset from their axis of rotation such that the seat, when rotated to a seating position, is positioned above the floor level and, when rotated to a storage position, is positioned in a recess with the opposite side of the seating surface defining the floor of the vehicle. In a preferred embodiment of the invention, the seating platform is slidably mounted to a beam such that the seat can be rotated to one or more intermediate vertical positions and locked in such positions with the seat platform defining a divider for a storage area between the seat platform and the rear of the vehicle.

36 Claims, 6 Drawing Sheets

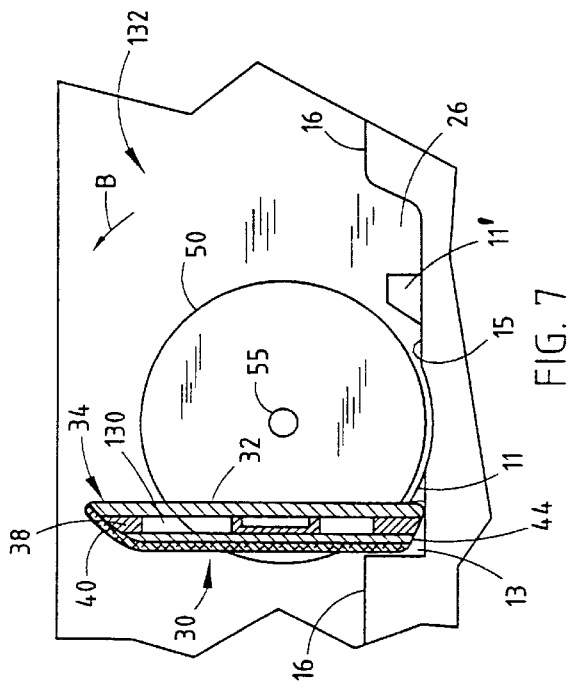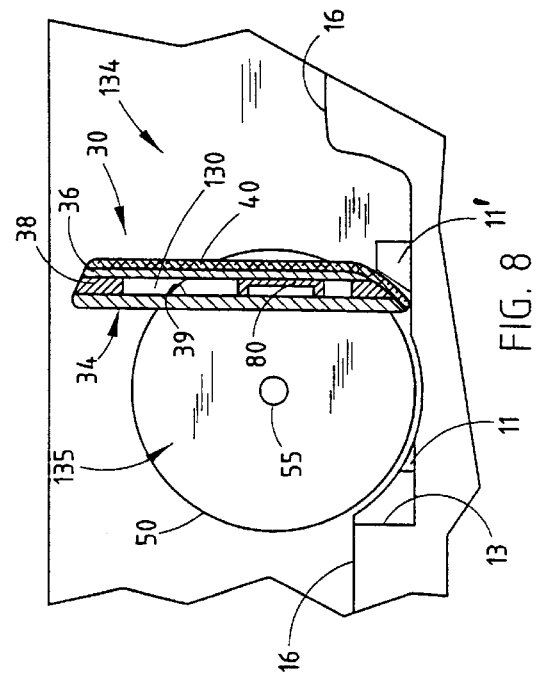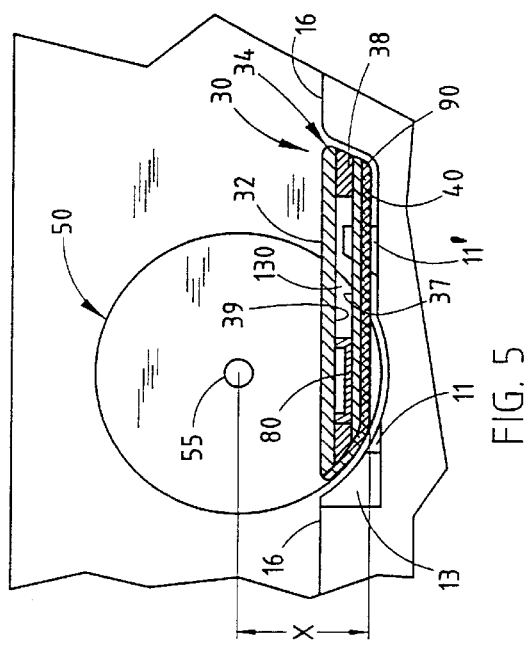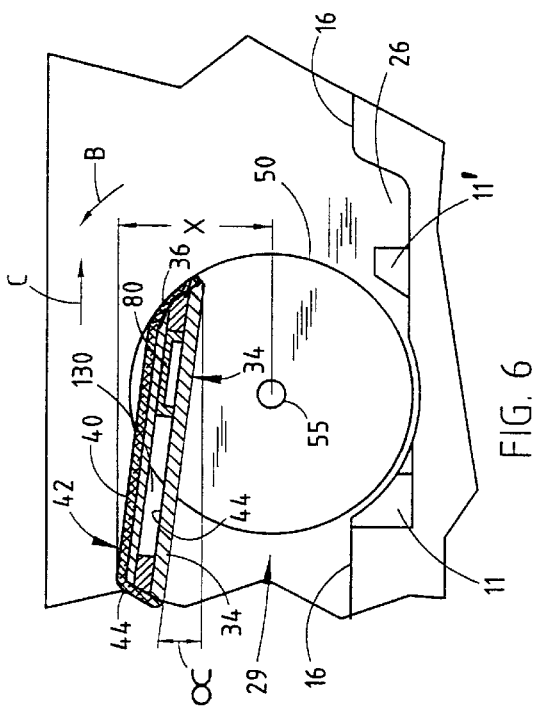

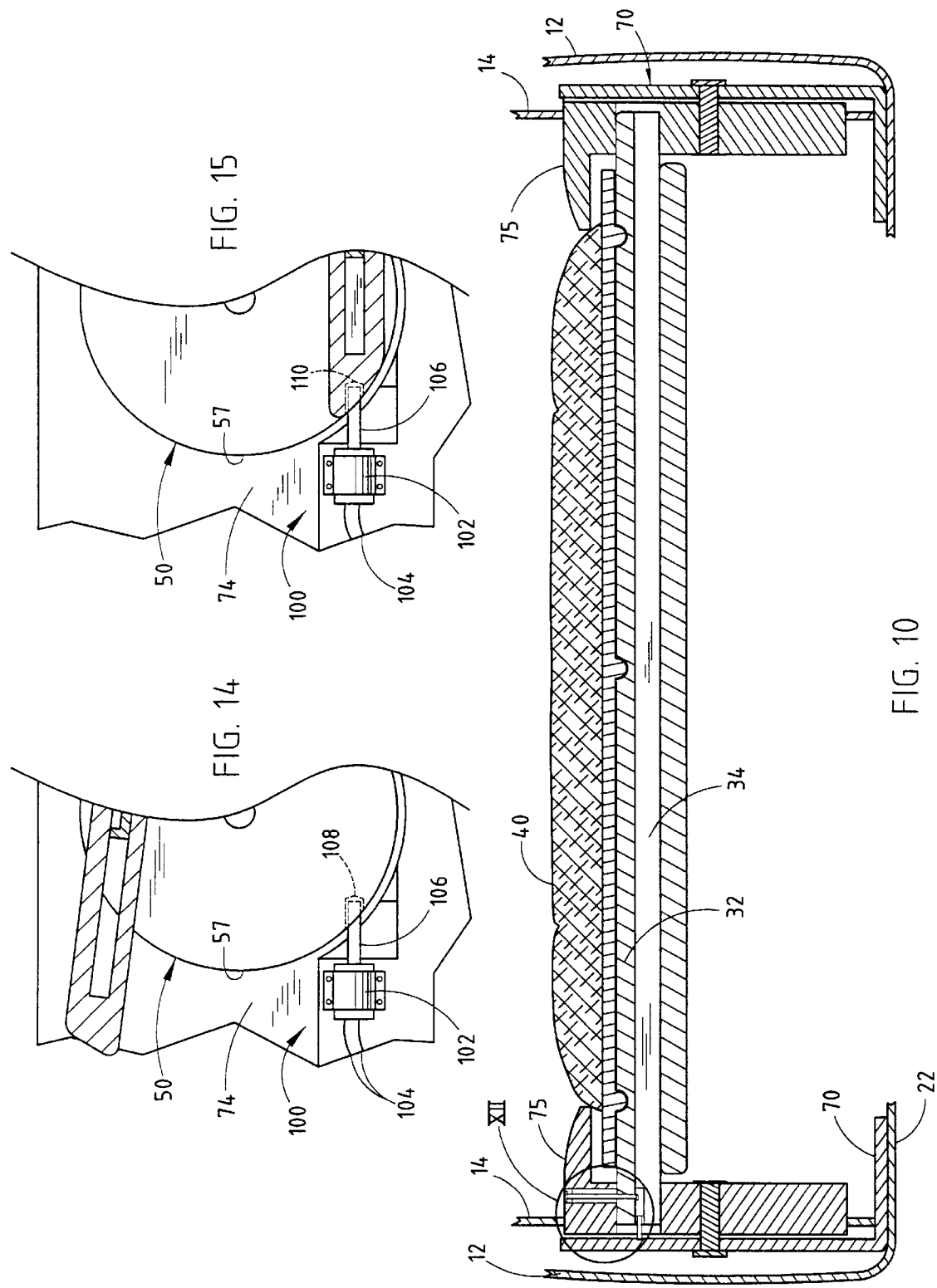

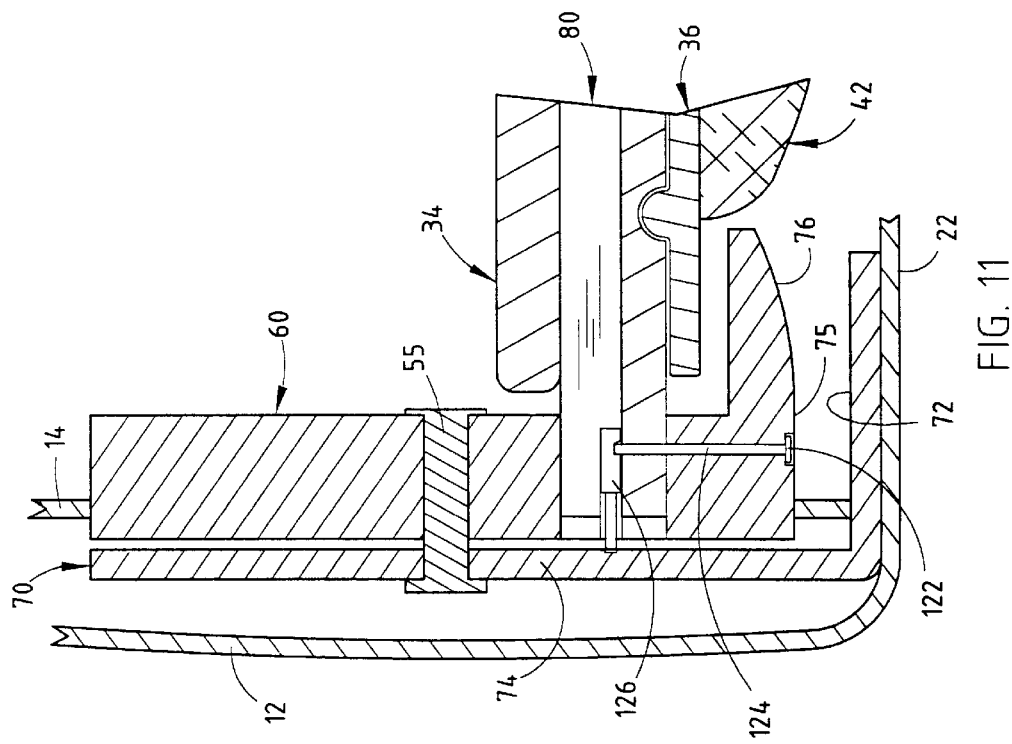
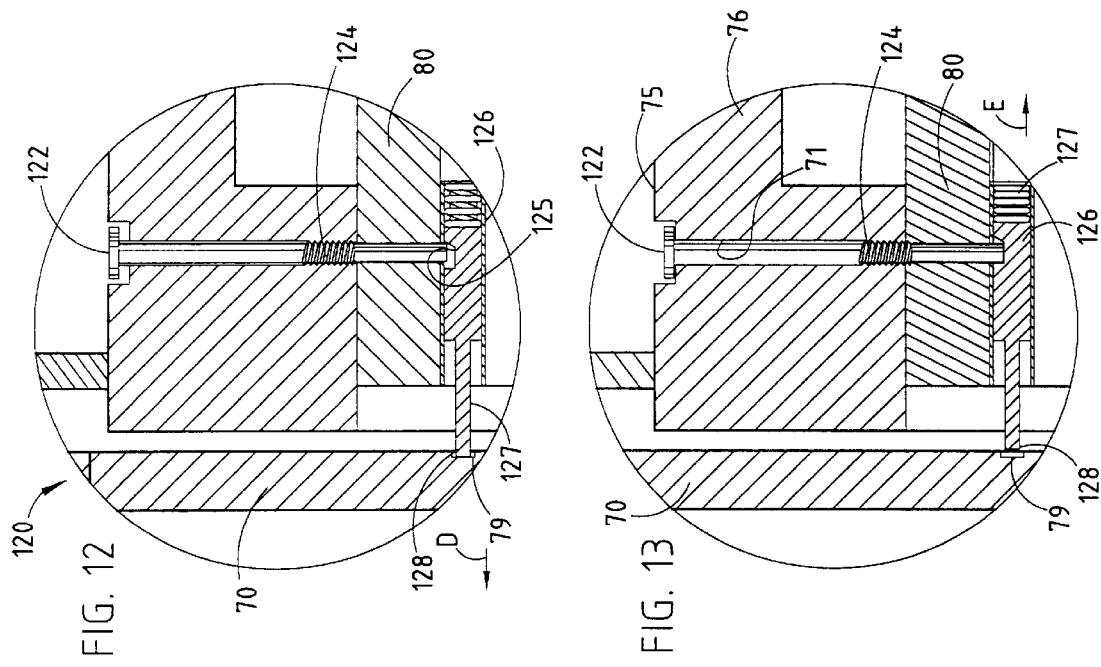

ROTATING SEAT/STORAGE UNIT

BACKGROUND OF THE INVENTION

The present invention relates to a vehicle seat and storage unit and particularly one which rotates between storage and use positions.

There exists a variety of seating arrangements by which seats can be folded from a use position in a vehicle to a flat position, providing a flat storage area for the vehicle. In most of these seating arrangements, such as in vans and utility vehicles such as a General Motors Suburban, when the seat is folded into a flat position to provide storage, the resultant flat surface is elevated above the foot rest floor level of the vehicle, thereby reducing the available storage volume. Other such seating arrangements, although providing folding seats which store into recesses within the body of the vehicle, have not utilized the seats to also define segregated storage areas when positioned in intermediate positions. Still further, the foldable seats of the prior art typically require a variety of connection links, pivot rods, feet and other structure for control of their folding and storage and, as a result, when in a use position for seating, the space under the seat is not available for additional storage.

As a result, there remains a need for a seating system in which a seat can be moved from a use position to a stored position or intermediate positions without removing the seat from the vehicle and which is easy to tumble out of the way to define a flexible seating arrangement with maximum storage and seating capacity.

SUMMARY OF THE PRESENT INVENTION

The seating/storage system of the present invention satisfies this need by providing a seat which is rotatably supported on opposite ends between the sidewalls of a vehicle on a pivot axis in spaced relationship above the floor level of the vehicle and mounted to a rotating member offset from the pivot axle such that, when rotated to a seating position, a seating platform is positioned above the floor level and, when rotated to a storage position, the seating platform is positioned in a recess with the opposite side of the seating surface defining the floor of the vehicle. In a preferred embodiment of the invention, the seating platform is slidably mounted to the rotatable member such that the seat can also be rotated to one or more intermediate positions and slid to a locked position with the seat platform defining a divider for a storage area between the seat platform and the rear of the vehicle.

In a preferred embodiment of the invention, the rotatable members each comprise a drum mounted in a recessed area of the vehicle sidewall and rotatably mounted to a structural member of the vehicle on each side. A support beam extends between the drums and is mounted in offset relationship to the pivot axis of the drums. A seat platform having a seating surface on one side and a floor surface on an opposite side is slidably mounted to the beam. As a result, when the seat platform is rotated between the seat use position and seat stored position, the seat moves from an elevated position above the floor of the vehicle to a recessed position vertically displaced from the elevated position with the floor side of the seat filling in the floor area of the vehicle.

As a result of this unique construction, the seat not only provides a floor which is substantially flush with the remaining floor area of the vehicle when stored, but a seat which, when in its seating position, is open under the seating area for additional storage under the seat. An additional benefit is the slidable mounting of the seat platform to the support beam such that in intermediate positions the seat provides a divider for a storage area behind the seat in the trunk area of the vehicle for different sized packages. In one embodiment of the invention, a seat back is removably attached to the seat platform and can be stored in a storage bin located forwardly of the seat storage recess when the seat is in a stored position.

These and other features, objects and advantages of the present invention will become apparent upon reading the following description thereof together with reference to the accompanying drawings.

BRIEF DESCRIPTION OF THE DRAWINGS

FIG. 5 is a fragmentary vertical schematic cross section of the seat taken along section lines V—V of FIG. 1;

FIG. 6 is a fragmentary vertical schematic cross section of the seat taken along section lines VI—VI of FIG. 2;

FIG. 7 is a fragmentary vertical schematic cross section of the seat taken along section lines VII—VII of FIG. 3;

FIG. 8 is a fragmentary vertical schematic cross section of the seat taken along section lines VIII—VIII of FIG. 4;

FIG. 10 is a fragmentary cross-sectional view of the seat shown in FIG. 2 taken along section line X—X of FIG. 2;

FIG. 11 is an enlarged fragmentary cross-sectional view of the left end of the structure shown in FIG. 10, shown with the seat rotated to a storage position;

FIG. 12 is an enlarged view of a latch for locking the seat in position with respect to sliding fore and aft on the support beam, showing the latch in a locking position;

FIG. 13 is a view of the latch shown in FIG. 12, shown in the unlatched position;

FIG. 14 is a fragmentary enlarged front elevational view of a locking mechanism for locking the seat in a use position as shown in FIGS. 2 and 6; and FIG. 15 is a fragmentary front elevational view of the locking mechanism with the seat in the position shown in FIGS. 1 and 5.

DETAILED DESCRIPTION OF THE PREFERRED EMBODIMENT

Figure 1:
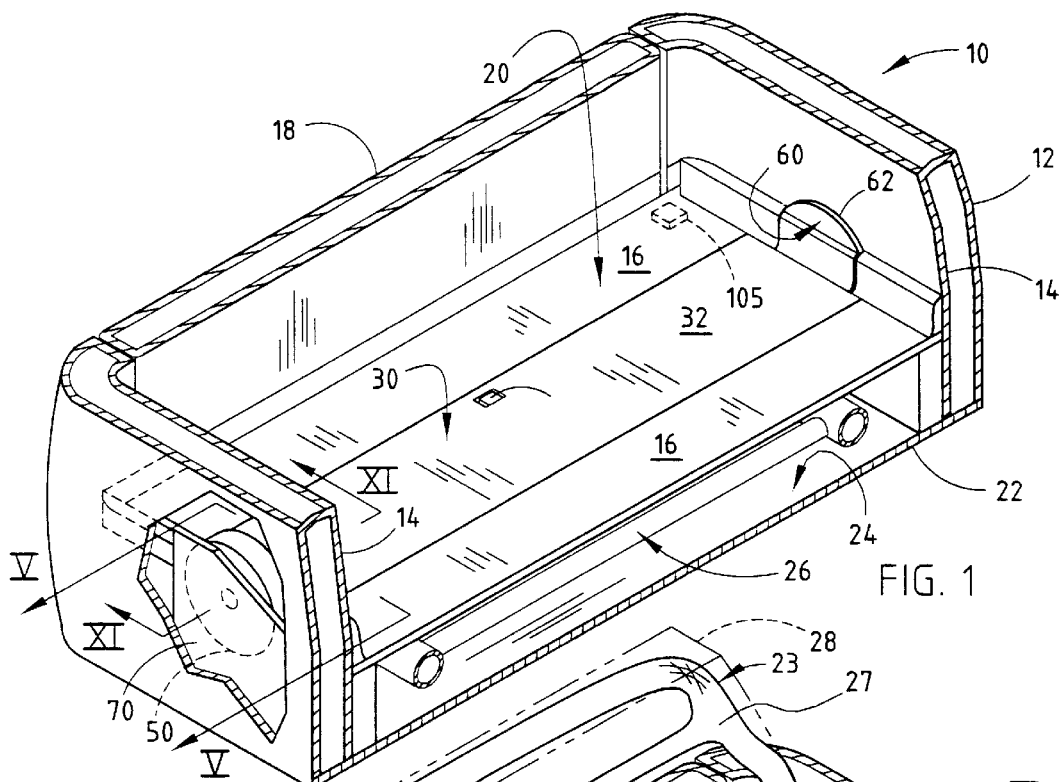
FIG. 1 is a fragmentary perspective view, partially broken away, showing a rear section of a vehicle including the seat of the present invention, shown in a stored position.

Referring initially to FIGS. 1–4, there is shown in broken-away form the rear trunk area of a vehicle 10, such as a mini-van or sports utility vehicle, which has an outer sheet metal skin 12, an inner skin 14 typically covered with an upholstery material and a floor 16 which forms the foot rest area of the vehicle. The vehicle typically will have a rear tailgate 18 which pivots downwardly from the vehicle in a conventional manner or can be split doors opening on vertical pivot axes, if desired, for gaining access to the rear storage and seating area 20 of vehicle 10. The vehicle chassis includes an underlying pan 22 which is mounted to the frame of the vehicle in a conventional manner and which defines a recessed storage area 24 for storing, in one embodiment of the invention, the back 23 of a seat assembly 30 of the present invention. The seat back 23 in the embodiment shown is a removable seat back, as described in greater detail below, which can be stored in area 24 when the seat assembly 30 is stored, as described in greater detail below. In other embodiments, the seat back 23 may be pivotally mounted to the seat assembly itself in a conventional manner.

The seat assembly 30 of the present invention uniquely provides a bench-type seat which is rotatable between a stored position in which a bottom surface 32 (FIG. 1) having a texture and material conforming to that of the vehicle floor 16 is flush with the vehicle floor. A handle or strap 31 is mounted to the panel 34 having surface 32 for rotating the seat assembly 30 from the stored position shown in FIG. 1 to a raised, use position shown in FIG. 2 in which an upholstered cushioned seating surface 40 is exposed and which is spaced above the floor 16 of the vehicle allowing seating on the cushioned surface 40 of assembly 30. The seat assembly 30 extends between a pair of rotating members 50 and 60 mounted on opposite sides of the vehicle. Members 50, 60 extend into circular recesses 52, 62 formed in sidewalls 14 of the vehicle and are rotatably mounted to an L-shaped bracket 70 (FIGS. 9–11), which is secured to the pan 22 of the vehicle by welding or other suitable fastening means. Each of the L-shaped brackets 70 include a base 72 (FIGS. 9–11), an orthogonal upwardly extending leg 74 and an aperture 76 for receiving an axle 55 for each of the rotatable members 50, 60.

Figure 9:
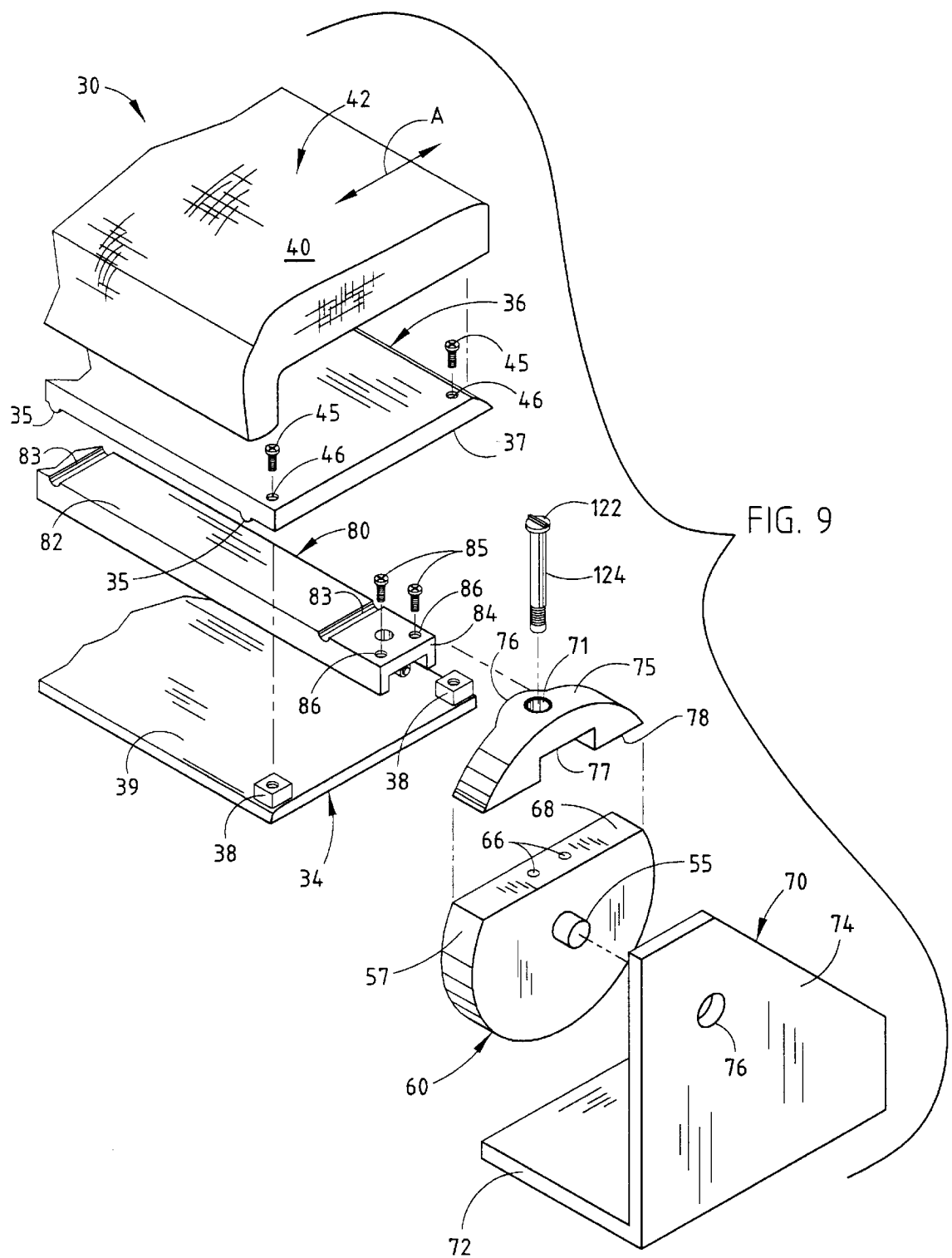
FIG. 9 is a fragmentary exploded perspective view of one end of the seat and mounting structure of the present invention.

The seat assembly 30 is formed of a rigid cross support beam 80 (FIGS. 9–11) made of a suitable structural member, such as a channel-shaped galvanized stamped steel beam, with conventional reinforcing ribs and edges and can be generally U-shaped, as seen in FIG. 9. The upper surface 82 of beam 80 includes longitudinally extending channels 83 at spaced locations therealong extending in the longitudinal direction of the vehicle for allowing the seating assembly 30 to slide fore and aft, as described in greater detail below. The opposite ends 84 of the structural beam 80 are secured to each of the rotatable members 50, 60 by suitable fasteners such as bolts 85, which extend through apertures 86 in beam 80 and into threaded apertures 66 in each of the rotatable members 50, 60.

Figure 2:
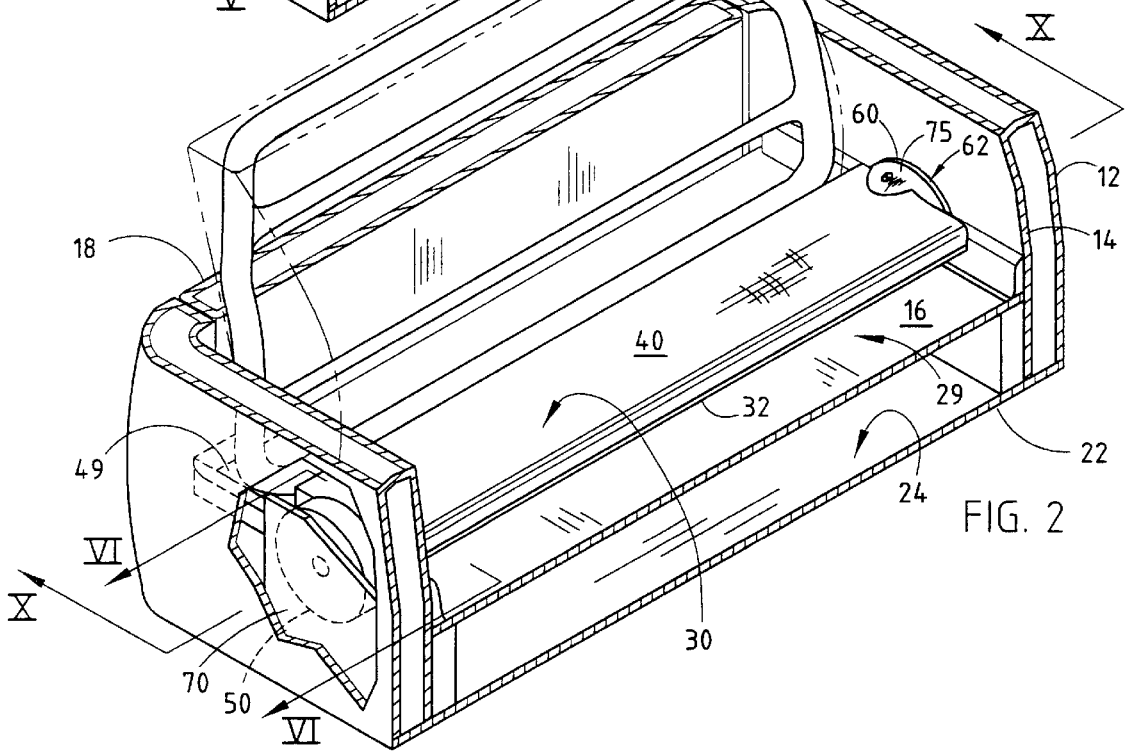
FIG. 2 is a fragmentary perspective view, partially broken away, of the seat shown in FIG. 1, shown with the seat in its use or seating position.

The rotatable members 50, 60 are generally drum or disk shaped and comprise solid steel or aluminum members with sufficient strength and rigidity to rotatably support the seating assembly between the mounting brackets 70, which extend between the inner 14 and outer 12 sidewalls of the vehicle, as best seen in FIG. 10. Each of the rotatable drums 50, 60 include a cap 75 which overlies the beam 80 and provides a finished appearance to the seating assembly, as seen in FIG. 2, at the junction between the rotatable members 50, 60 and the seating surface 40. The cap may for such include an inwardly projecting lip 76 and a channel end receiving U-shaped slot 77 for receiving the ends 84 of the beam 80 Cap 75 includes a lower surface 78 which mates with the flat truncated surface 68 of the drum-shaped members 50, 60. Cap 75 is secured to the members 50, 60 in a conventional manner as by recessed threaded fasteners (not shown) which are trimmed by a snap-in trim plug or the like.

The seating assembly 30 is slidably attached to the structural cross beam 80 for movement fore and aft in the vehicle in the direction indicated by arrow A in FIG. 9 sandwiching the support beam 80 between an upper seat support platform 36 and a lower seat support platform member 34 with the lower surface 37 of platform 36 including semi-round guides 35 which extend within semi-cylindrical grooves 83 of the support beam, thereby preventing skewing of the seat assembly 30 with respect to support beam 80 when the seat is slidably moved. The lower platform 34 includes a plurality of spacers 38 extending upwardly therefrom and providing sufficient space for the sliding motion of seat assembly 30 with respect to support cross beam 80.

Beam 80 may include a plurality of lubricous polymeric pads made of polypropylene or the like mounted on the surfaces contacting the lower surface 37 of upper support beam 36 and the upper surface 39 of lower platform 34 to provide smooth, rattle-free sliding and guided motion of the seat assembly 30 with respect to the cross beam 80. Capping the upper seating platform 36, which is generally rectangular and extends substantially across the width of the seat as seen in FIG. 10, is a padded cushion 42 with a seating surface 40 which can be attached to the platform 36 in a conventional manner as by adhesives or other upholstery techniques. Platform 36 may be made of a composite material such as wood laminate, polymeric material or other suitable material to provide sufficient support for the seat and cushion 42 in conjunction with the lower platform 34 made of a suitable material. Platforms 34 and 36 are secured to one another by a plurality of fastening screws 45 extending through apertures 46 in upper member 36 and threadably secured to lower platform 34 prior to assembly of cushion 42 onto platform 36.

As can be seen with reference to FIGS. 5–9, the ends 84 of beam 80 and, therefore, the seating assembly 30 itself is mounted in offset spaced relationship to the axle 55 such that when the seating assembly is rotated from a storage position, as shown in FIG. 1, to the seating position, as shown in FIG. 2, the seating surface 40 moves a distance corresponding to 2X with X being the offset distance, as seen in FIGS. 5 and 6, between the center of axle 55 and the surface 40 of seating cushion 42.

In a preferred embodiment of the invention, the diameter of the drums 50, 60 were approximately 17½ inches and the distance X approximately 8 inches. The seat surface 40, when in a use position, is cantered upwardly (FIG. 6) at an angle oc of approximately 20°, such that the forward edge 44 of seat cushion 42 is elevated above the floor level 16 of the vehicle a comfortable distance of about 16 inches. By offsetting the mounting of the seat assembly 30 from the rotating axis of the support drums 50, 60, the seat can rotate between the stored position, as shown schematically in FIG. 5, and within a recessed pocket 90 (FIG. 5) formed in the pan 22 of the vehicle and communicating with storage area 26 (FIGS. 1–4) and be rotated approximately 160° to the use position shown in FIGS. 2 and 6 utilizing strap or handle 31. As will be described in greater detail below, the seat can also be moved into intermediate positions as shown in FIGS. 7 and 8 for providing different storage areas in front of the seat and between the seat and the rear door 18 of the vehicle 10.

Two separate latching mechanisms 100 (FIGS. 14 and 15) and 120 (FIGS. 9–13) are provided to lock the drums 50, 60, respectively, in a fixed rotated position and for locking the seat in a fixed slidably adjusted position with respect to beam 80. Referring initially to FIGS. 14 and 15, mounted to the inner sidewall of leg 74 of mounting bracket 70 for the drums 50, 60 is an electrically operated solenoid 102 having control conductors 104 extending to a push-button electrical control switch 105 (FIG. 1) which can be conveniently located in the rear deck area of the vehicle for access. The solenoid 102 includes a plunger 106 which is spring loaded forwardly and extends into a first aperture 108 formed in each of the drums 50, 60 at an angular location corresponding to the seat use position as shown in FIGS. 2, 6 and 14 and a second aperture 110 extending into the peripheral wall 57 of each of the drums 50, 60 to lock the seat assembly 30 in the stored position as shown in FIGS. 1, 5 and 15. Thus, actuation of push-button switch 105 retracts plunger locking pin 106 of solenoid 102 momentarily to allow the user to raise the seat from the stored position, shown in FIG. 1, rotating the seat and drums 50, 60 about axles 55 until the spring-loaded plunger 106 is aligned with aperture 108 in each of the drums which snap-locks the pin 106 into the solid drums, locking the seat in a use position. For storage of the seat, switch 105 again is pressed to retract pin 106 from aperture 108 and the seat is rotated to the horizontal stored position shown in FIGS. 1, 5 and 15 in which the pin 106 seeks aperture 110 lockably holding the seat in a floor-defining position with surface 32 substantially coplanar with the remaining floor 16 of the vehicle, as best seen in FIG. 1.

When the seat is in its raised use position as seen in FIG. 2, the seat back 23, which includes a frame 27 and suitable upholstery covering 28 thereover, is received in a socket 49 (shown schematically in FIG. 2) at the rear edge of seat 40 utilizing conventional vertical mounting posts or the like for the attachment of seat back 23 thereto. The seat back 23 may also be hinged to the rear edge of the seat assembly 30 and double hinged with locking hinges or the like to fold up from the seating surface 40 of the seat assembly 30 if desired.

The seating system of the present invention not only provides the unique rotatable seat which moves from a stored flat position coplanar with the floor of the vehicle, as seen in FIG. 1, to a raised use position, as shown in FIG. 2, in which the area 29 under seat assembly 30 defines additional open storage area for use by the vehicle occupants, it also can be slid with respect to beam 80 as now described in greater detail below in connection with FIGS. 5–8 to define additional segmented storage for the vehicle.

As seen in the cross-sectional schematic views of FIGS. 5–8, the supports 34 and 36 of the seat assembly 30 define an open slot 130 between the surface 39 of platform 34 and the facing surface 37 of member 36 formed by the spacers 38 (FIG. 9). This slot 130 allows the seat assembly 30 to slide forwardly and rearwardly when in first or second vertical positions, as seen in FIGS. 7 and 8, when the latch assembly 120 (FIGS. 10–13) is released allowing the seat assembly 30 to slide relative to the cross beam 80. The latch assembly 120 is described in greater detail below, however, the sliding action is first described in connection with FIGS. 5–8.

Figure 3:
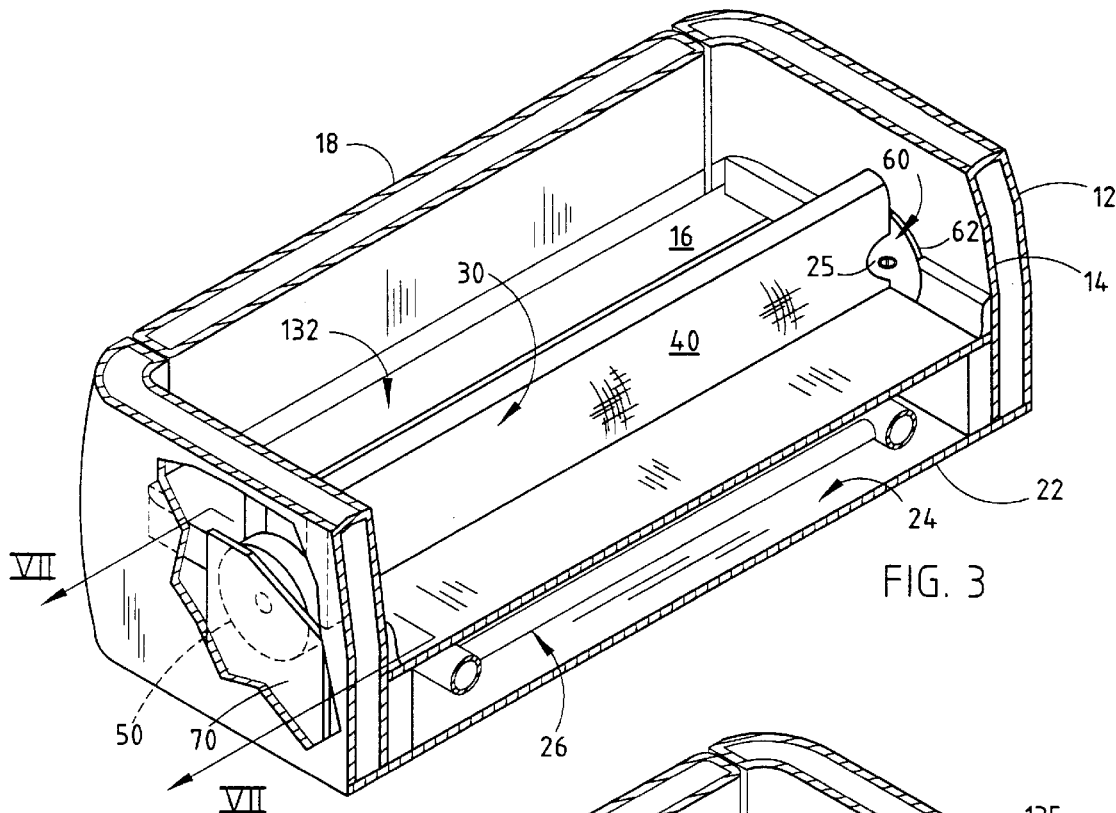
FIG. 3 is a fragmentary perspective view, partially broken away, showing the seat in a first intermediate position defining a storage area therebehind.

As seen in FIGS. 5–6, the seat assembly 30 is locked with respect to cross beam 80 and drums 50, 60 in an end position for both the stored and use positions. Thus, the beam is adjacent the forward end of the slot 130, as viewed in FIG. 5, and remains in that relative position as the seat is rotated in a counterclockwise direction, as indicated by arrow B in FIG. 6, to its use position where it is locked in place by the latch assembly 100. The seat can be moved to a partitioning position by first releasing latch 120 and sliding the seat assembly 30 rearwardly in a direction indicated by arrow C in FIG. 6, releasing latch assembly 100 by actuating switch 105 and subsequently rotating the seat assembly 30 in a further counterclockwise direction as indicated by arrow B in FIG. 7 such that the forward edge 44 of seat assembly 30 extends downwardly adjacent a wall 13 of recessed area 26 into which the seat is stored. In this position, the cushion 42 engages the vertically extending wall 13 while the lower surface 32 of the seat assembly engages a stop 11 on the floor 15 of the recessed storage area 26. This arrangement defines behind the floor surface 32 of seat assembly 30 a storage area 132 (FIGS. 7 and 3) for receiving substantially large packages which fit in the storage bin area 26 and the rear floor area 16 of the vehicle. During movement of the seat assembly 30 to this position, it is moved in a direction indicated by arrow C all the way to the end of the slot 130 to provide clearance for the junction of floor 16 and vertical wall 13 and is then subsequently dropped downwardly into the slot defined between the sidewall 13 and stop 11 locking the seat in this intermediate partitioning wall position as shown in FIGS. 3 and 7.

In order to provide a somewhat smaller storage area behind seat assembly 30 and define a larger storage area in front of seat assembly 30, the seat assembly 30 can also be moved from a position shown in FIGS. 5, 6 or 7 by releasing latch assembly 120 allowing the seat to slide with respect to beam 80 with the seat now being slid in a forward direction opposite arrow C and the drums 50, 60 rotated in a clockwise direction (opposite arrow B) to the position shown in FIG. 8 in which the cushion surface 40 of seat assembly 30 now faces rearwardly in the vehicle and engages a stop 11' defining a smaller storage area 134 behind the vertically extending seat assembly 30 but defining a somewhat larger storage area 135 in the area in front of seat assembly 30.

Figure 4:
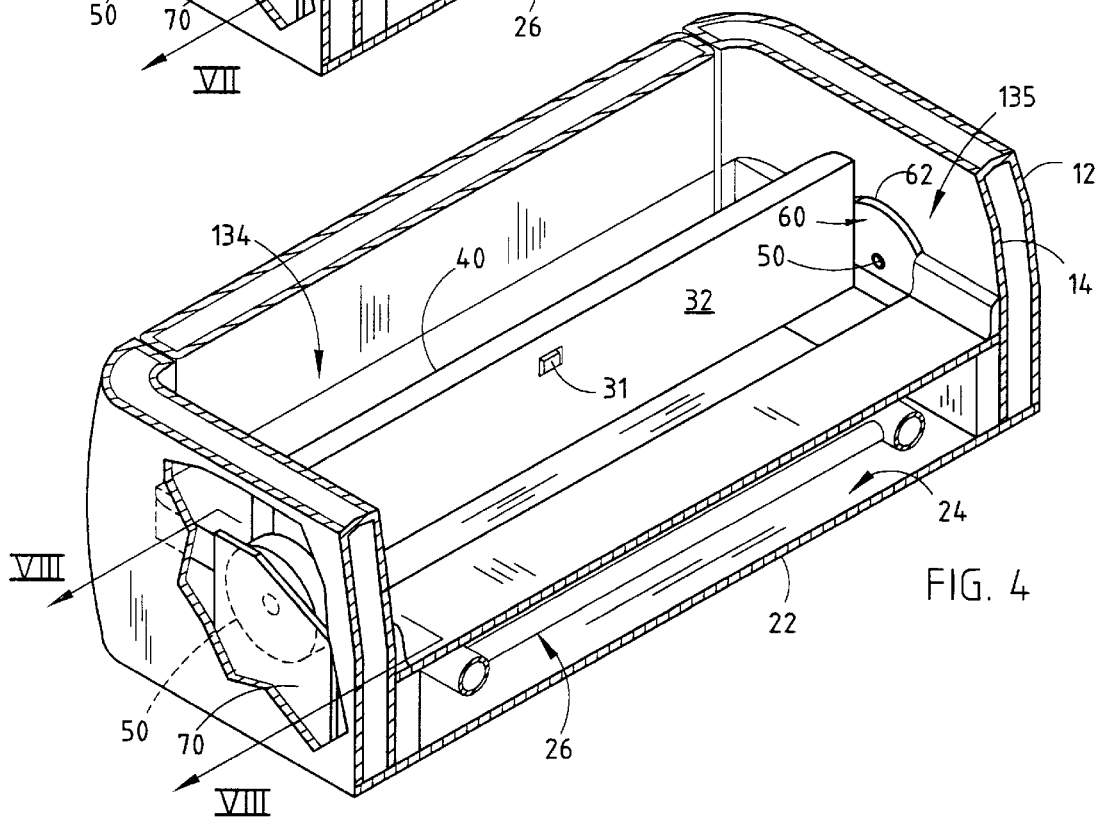
FIG. 4 is a fragmentary perspective view, partially broken away, showing the seat in a second intermediate position defining a smaller storage area therebehind.

This storage position is illustrated also in FIG. 4 which shows the floor surface 32 of seat assembly 30 facing forwardly and the cushion surface 40 facing rearwardly. Thus, the rear deck area 20 (FIG. 1) of the vehicle can be partitioned into larger (132) or smaller (134) storage areas as seen in FIGS. 3 and 4 for supporting packages such as grocery bags or the like therein. The latch assembly 120 for controlling the sliding motion of seat assembly 30 with respect to beam 80 may include a control knob actuator 122 with an elongated threaded shaft 124 which extends through threaded aperture 71 in member 75 with its end engaging a cam slot 125 in a spring-loaded cross pin 126. The cross pin 126 includes a compression spring 127 to urge the locking pin in a locking position as indicated by arrow D in FIG. 12 with the tip 128 of cross pin 126 extending within an aperture 79 in mounting plate 70 to prevent the sliding of the seat assembly 30 with respect to the drums 50, 60. The threaded actuator 122 can be rotated, as illustrated in FIG. 13, by moving the shaft 124 down and the locking pin cross member 126 in a direction opposite arrow D as shown by arrow E in FIG. 13 to remove the end 128 of cross pin 126 from aperture 79, thereby allowing the seat assembly 30 to slide as desired for the intermediate storage defining positions as shown in FIGS. 3, 4, 7 and 8. The actuator 122 preferably is formed on one of the caps 75, as best seen in FIG. 11, and includes a knob for convenience of use.

Thus, the seating system of the present invention provides a seat which rotates on an axis for storage of the seat with its lower surface flush with the floor of the vehicle to a use position rotated about the pivot axis for use in seating. For such purpose, a pair of rotatable members, such as cylindrical drums mounted to opposite sidewalls of the vehicle, are employed with a support beam extending therebetween for supporting the seat. In a preferred embodiment of the invention, the seat assembly is slidably mounted to the support beam such that the seat can further be slid to adjusted positions for providing partitioning of the storage area of the vehicle behind and in front of the seat to define different sized storage areas. Although the rotatable members of the present invention are shown as disk-shaped drums, it is only important that the rotatable members provide an offset mounting arrangement for the seat support structure relative to the pivot axle of the members such that the seat moves vertically from a stored position to a raised use position.

The seating system of the present invention, therefore, provides a compact storable seat which provides an open storage area under the seat when in a use position and a flat, entirely open area for a vehicle with maximum storage volume when the seat is in a fully stored position. It also can be adjusted to vertical positions for partitioning the storage area of the vehicle in which the seat is mounted. Although specific latches are shown for latching the seat in a rotated stored or use position and for latching the sliding motion of the seat with respect to the support beam, different latching arrangements can be employed. Also, although illustrated as a bench seat, the seat cushion 40 can be formed to define bucket-type seats and different seat backs than disclosed in the embodiment shown may also be employed. These and other modifications to the preferred embodiment of the invention as described herein will be apparent to those skilled in the art but will fall within the spirit or scope of the invention as defined by the appended claims.

The invention claimed is:

1. A storable seat assembly comprising:
   a seat platform having a seating surface and a lower surface on a side of said platform opposite said seating surface extending substantially the width of a vehicle; and
   a pair of rotatable members having an axis of rotation for rotatably mounting in spaced relationship to a vehicle, wherein said seat platform is mounted to said rotatable members in offset relationship to said axis of rotation such that as said rotatable members are rotated between a first position in which said lower side of said seat platform is in a position substantially flush with a vehicle floor to a second position remote from said first position in which said seating surface is in spaced relationship above the floor of the vehicle, wherein said rotatable members are disks.

2. The assembly as defined in claim 1 wherein the seat platform comprises a support beam extending between said disks in offset relationship to the axis of rotation of said disks.

3. The assembly as defined in claim 2 wherein said seat platform includes at least one support slidably mounted to said beam for allowing said seat to move in a fore and aft direction with respect to said beam.

4. The assembly as defined in claim 3 and including means for rotatably supporting said disks and a first latch extending between said supporting means and said disks for selectively preventing rotation of said disks.

5. The assembly as defined in claim 4 and including a second latch extending between said at least one support and said beam for preventing sliding motion of said seat platform with respect to said beam.

6. The assembly as defined in claim 5 wherein said supporting means comprises an L-shaped mounting bracket for rotatably mounting each of said disks to a vehicle.

7. A storable seat assembly comprising:
   a seat platform having a seating surface and a lower surface on a side of said platform opposite said seating surface extending substantially the width of a vehicle; and
   a pair of rotatable members having an axis of rotation for rotatably mounting in spaced relationship to a vehicle, wherein said seat platform is mounted to said rotatable members in offset relationship to said axis of rotation such that said rotatable members are rotated between a first position in which said lower side of said seat platform is in a position substantially flush with a vehicle floor with said platform aligned below said axis of rotation and a second position remote from said first position in which said seating surface is in spaced relationship above the floor of the vehicle with said platform aligned above said axis of rotation, wherein said seat platform includes a support beam extending between said rotatable members and first and second planar elongated rectangular seat support members positioned on opposite sides of said support beam and slidably mounted in spaced relationship to said beam.

8. The assembly as defined in claim 7 and further including longitudinally extending guides mounted to one of said support beam and a seat support member and extending between said support beam and at least one of said seat support members.

9. A storable seat assembly comprising:
   an elongated support beam for extending substantially across the width of a vehicle;
   a pair of rotatable members to rotatably mount said beam to vehicle sidewalls by axle means, wherein said beam is mounted to said rotatable members in offset relationship to their axis of rotation such that as said rotatable members are rotated, said beam moves in a vertical direction; and
   at least one seat mounted to said support beam, wherein said seat includes a lower surface which conforms to the floor of a vehicle and an opposite upper cushioned surface.

10. The assembly as defined in claim 9 wherein said seat is slidably mounted to said beam.

11. The assembly as defined in claim 10 wherein said beam and seat can be rotated to at least one position in which said seat extends generally vertically to define a wall of a storage area in a vehicle.

12. The assembly as defined in claim 11 wherein said seat is a bench-type seat extending substantially the width of a vehicle in which said assembly is mounted.

13. The assembly as defined in claim 12 wherein said rotatable members are disks.

14. The assembly as defined in claim 13 and further including a first latch for preventing rotation of said disks.

15. The assembly as defined in claim 14 and further including a second latch for preventing sliding motion of said seat members with respect to said beam.

16. The assembly as defined in claim 15 and further including a generally L-shaped mounting bracket for rotatably mounting each of said disks to a vehicle.

17. A vehicle and storable seat assembly comprising:
   a vehicle having a floor and a recessed area extending below said floor, said vehicle further including a pair of spaced-apart sidewalls on opposite sides of said floor;
   a seat platform having a seating surface and a lower surface on a side of said platform opposite said seating surface extending substantially between said sidewalls; and
   a pair of spaced rotatable members having an axis of rotation rotatably mounted to said vehicle, wherein said seat platform is mounted to said rotatable members in offset relationship to the axis of rotation such that said rotatable members are rotated from a first position with said seat platform in said recessed area in which said lower side of said seat platform is substantially flush with said vehicle floor to a second position remote from said first position in which said seating surface is in spaced relationship above said floor of said vehicle, wherein said rotatable members are disks.

18. The assembly as defined in claim 17 wherein the seat platform comprises a support beam extending between said disks in offset relationship to the axis of rotation of said disks.

19. The assembly as defined in claim 18 wherein said seat platform includes at least one support slidably mounted to said beam for allowing said seat to move in a fore and aft direction with respect to said beam.

20. The assembly as defined in claim 19 and including L-shaped brackets for rotatably supporting said disks.

21. The assembly as defined in claim 20 and further including a first latch extending between at least one of said brackets and an associated disk for selectively preventing rotation of said disks.

22. The assembly as defined in claim 21 and including a second latch extending between said at least one support and said beam for preventing sliding motion of said seat platform with respect to said beam.

23. A vehicle and storable seat assembly comprising:
 a vehicle having a floor and a recessed area extending below said floor, said vehicle further including a pair of spaced-apart sidewalls on opposite sides of said floor;
 a seat platform having a seating surface and a lower surface on a side of said platform opposite said seating surface extending substantially between said sidewalls; and
 a pair of spaced rotatable members having an axis of rotation rotatably mounted to said vehicle, wherein said seat platform is mounted to said rotatable members in offset relationship to the axis of rotation such that said rotatable members are rotated from a first position with said seat platform in said recessed area in which said lower side of said seat platform is substantially flush with said vehicle floor to a second position remote from said first position in which said seating surface is in spaced relationship above said floor of said vehicle, wherein said seat platform includes a support beam extending between said rotatable members and first and second planar elongated rectangular seat support members positioned on opposite sides of said support beam and slidably mounted in spaced relationship to said beam.

24. The assembly as defined in claim 23 and further including longitudinally extending guides extending between said support beam and at least one of said seat support members.

25. The assembly as defined in claim 24 wherein said beam and seat support member can be rotated to a generally vertically extending position to define a wall of a storage area in said vehicle.

26. The assembly as defined in claim 25 wherein said beam and support member can be rotated to two spaced-apart vertically extending positions to define different sized storage areas in said vehicle.

27. A four-position seat assembly comprising:
 a seat platform; and
 means for rotatably mounting said seat platform to a vehicle for movement to a first seating position, a second position with a lower surface of the seat platform substantially flush with a vehicle floor, a third position with said seat platform extending generally vertically with said cover surface facing a first direction, and a fourth position with said seat platform extending generally vertically with said lower surface facing a direction opposite said first direction.

28. The assembly defined in claim 27 wherein the seat platform includes a support beam and said means for rotatably mounting said seat platform comprises a pair of spaced-apart disks, said beam extending between said disks in offset relationship to the axis of rotation of said disks.

29. The assembly defined in claim 28 wherein said seat platform includes at least one support slidably mounted to said beam for allowing said seat to move in a fore and aft direction with respect to said beam.

30. The assembly defined in claim 29 and including means for rotatably supporting said disks and a first latch extending between said supporting means and said disks for selectively preventing rotation of said disks.

31. The assembly defined in claim 30 and including a second latch extending between said at least one support and said beam for preventing sliding motion of said seat platform with respect to said beam.

32. The assembly defined in claim 31 wherein said supporting means comprises an L-shaped mounting bracket for rotatably mounting each of said disks to a vehicle.

33. The assembly defined in claim 27 wherein said seat platform includes a support beam and first and second planar elongated rectangular seat support members positioned on opposite sides of said support beam and slidably mounted in spaced relationship to said beam.

34. The assembly defined in claim 33 and further including longitudinally extending guides mounted to one of said support beam and a seat support member and extending between said support beam and at least one of said seat support members.

35. A seat assembly comprising:
 a seat having a cushion side and an opposite side; and
 a pair of spaced members having an axis of rotation for rotatably mounting said seat to a vehicle, wherein said seat is mounted to said members in offset relationship to the axis of rotation of said members, such that as said seat is in a first position, the opposite side is in a lowered position and when said seat is rotated to a position remote from said first position, said cushion side is vertically displaced in an upward direction, wherein said members are disks.

36. A seat assembly comprising:
 a seat having a cushion side and an opposite side; and
 a pair of spaced members having an axis of rotation for rotatably mounting said seat to a vehicle, wherein said seat is mounted to said members in offset relationship to the axis of rotation of said members, such that as said seat is in a first position, the opposite side is in a lowered position and when said seat is rotated to a position remote from said first position, said cushion side is vertically displaced in an upward direction, wherein the seat comprises a support beam and a seat support slidably mounted to said beam allowing the seat to move in a fore and aft direction with respect to said beam.

* * * * *